F. W. POMEROY.
VALVE STEM PACKING.
APPLICATION FILED OCT. 9, 1916.
1,234,084.
Patented July 17, 1917.
Fig. 1.
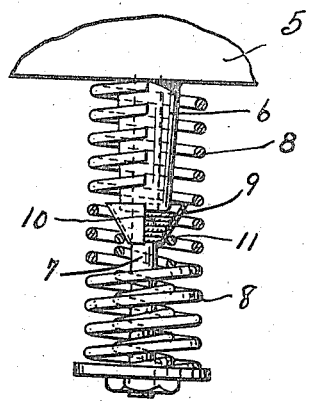
Fig. 2.
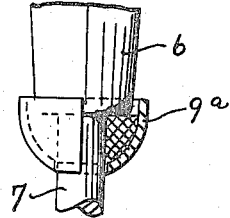
Fig. 4.
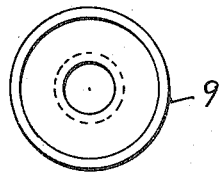
Fig. 3.
INVENTOR
FLETCHER W. POMEROY.
by Andrew T. Martell
ATTORNEY.

UNITED STATES PATENT OFFICE.

FLETCHER W. POMEROY, OF BURBANK, CALIFORNIA.

VALVE-STEM PACKING.

1,234,084.   Specification of Letters Patent.   Patented July 17, 1917.

Application filed October 9, 1916. Serial No. 124,487.

*To all whom it may concern:*

Be it known that I, FLETCHER W. POMEROY, a citizen of the United States, residing at Burbank, in the county of Los Angeles and State of California, have invented new and useful Improvements in Valve-Stem Packing, of which the following is a specification.

My invention relates primarily to the intake valve stem of an explosion engine, although I do not limit myself to such use.

Heretofore in the use of explosion engines, particularly in automobiles and like vehicles, it has been found that wear occurs both in the valve stem and in the bearing through which it passes thereby allowing air to enter around said stem upon each intake stroke of the particular cylinder to which that valve appertains resulting in weakening the fuel mixture drawn in through the carbureter to that cylinder and thus greatly reducing the efficiency thereof.

It is the object of my invention to provide means for correcting this objectionable feature, which will be cheap, simple in operation and construction and which will be easy to attach or detach from its position of use.

A further object is to provide a device of this character which will be automatic in operation and which will require the minimum of attention and repair.

Other objects and advantages will appear hereinafter.

I accomplish these objects by the device described herein and illustrated in the accompanying drawings forming a part hereof in which :—

Figure 1 is a side elevation of a fragment of the cylinder head of an explosion engine, showing the intake valve stem and its bearing with my device attached thereto, partly broken away.

Fig. 2 is a side elevation, partly in section of my device detached from its place of use.

Fig. 3 is a top plan of Fig. 2.

Fig. 4 is a side elevation, partly in section, of a modified form of my device.

In the drawings 5 represents the cylinder head, 6 the valve stem bearing and 7 the valve stem of an explosion engine of any approved make. 8 is the valve spring as ordinarily used. Slidably mounted upon stem 7 just below the free end of bearing 6 is a hollow casing 9 in shape similar to a reversed truncated cone, the upper or larger end being of a diameter to clear the said end of bearing 6, and the lower or smaller end being of a diameter to fit snugly but loosely on stem 7. Packing 10, preferably asbestos cord, but any desired material suitable for the purpose may be used, is mounted within casing 9, and surrounding stem 7 with its upper end abutting against the lower end of bearing 6. A coil spring 11 surrounds stem 7 and the upper end thereof bears against the lower end of casing 9, the lower end bearing against the disk on the lower end of stem 7.

In the operation of my device the same will be positioned as shown in Fig. 1. As the valve stem is moved upwardly in the usual manner spring 11 will force casing 9 upwardly and with it packing 10, which packing, owing to the cone shape of casing 9, will be forced inwardly and close the opening between bearing 6 and stem 7 thereby preventing air entering the same.

In the modified form shown in Fig. 4, I have shown a cup-shaped casing $9^a$ in lieu of the frusto-conical shaped casing 9 of the preferred form. Otherwise the parts are identical.

Having described my invention what I claim is:

1. A valve stem packing for explosion engines comprising a thin sheet metal casing inverted frusto-conical in shape and open at the ends, the lower smaller end of said casing being slidably mounted on the valve stem and the upper end surrounding the lower end of the valve stem bearing but spaced therefrom; packing material within said casing surrounding said valve stem; and a spring coiled around said valve stem below said casing, the upper end thereof engaging said casing and the lower end engaging said valve stem whereby said casing is pressed upwardly to cause said packing to close the opening between said stem and bearing and prevent leakage of air therethrough.

2. In an explosion engine the combination of a reciprocating valve having a stem; a bearing for said stem through which the same projects; a disk mounted on the outer end of said stem; a coil spring surrounding said stem between said bearing and disk; and an inverted frusto-conical casing open at the ends surrounding said valve stem adjacent to the end of said bearing the lower smaller end of said casing being in slidable contact with the valve stem and the upper end surrounding the lower end of said bearing but spaced therefrom; packing material in said casing surrounding said stem; a spring coiled around said stem below the casing and between the same and said disk whereby said casing is pressed upwardly to cause said packing material to close the opening between the valve stem and its bearing to prevent the passage of air therethrough.

3. In an explosion engine the combination of a reciprocating valve having a stem; a bearing for said valve stem through which the same projects; a disk mounted on the outer end of said stem; a coil spring surrounding said stem between said bearing and disk; and an inverted frusto-conical shaped casing open at the ends surrounding said stem within said coil spring and adjacent to the free end of said bearing, the lower smaller end of said casing being slidably mounted on said stem and the upper end surrounding the free end of said bearing but spaced therefrom; flexible packing material within said casing surrounding said stem; a spring coiled around said stem below the casing and between the same and said disk whereby said casing is pressed upwardly and the packing contained therein is pressed upwardly and inwardly to close the opening in said bearing around said valve stem.

4. A valve stem packing for explosion engines comprising a thin sheet metal cup-shaped casing open at the ends, the lower smaller end of said casing being slidably mounted on the valve stem and the upper end surrounding the lower end of the valve stem bearing but spaced therefrom; packing material within said casing surrounding said valve stem; and a spring coiled around said valve stem below said casing, the upper end thereof engaging said casing and the lower end engaging said valve stem whereby said casing is pressed upwardly to cause said packing to close the opening between said stem and bearing and prevent leakage of air therethrough.

In witness that I claim the foregoing I have hereunto subscribed my name this 3rd day of October 1916.

FLETCHER W. POMEROY.